(12) United States Patent
Post et al.

(10) Patent No.: US 12,429,841 B2
(45) Date of Patent: *Sep. 30, 2025

(54) ADAPTERS FOR COMMUNICATION BETWEEN POWER TOOLS

(71) Applicant: MILWAUKEE ELECTRIC TOOL CORPORATION, Brookfield, WI (US)

(72) Inventors: Matthew Post, Milwaukee, WI (US); Kellen Carey, Portland, OR (US); Gareth Mueckl, Milwaukee, WI (US); Jeremy R. Ebner, East Troy, WI (US); Tauhira Hoossainy, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,671

(22) Filed: Jun. 24, 2024

(65) Prior Publication Data
US 2024/0402672 A1 Dec. 5, 2024

Related U.S. Application Data

(63) Continuation of application No. 17/837,580, filed on Jun. 10, 2022, now Pat. No. 12,019,420, which is a
(Continued)

(51) Int. Cl.
*G05B 19/042* (2006.01)
*B23Q 11/00* (2006.01)

(52) U.S. Cl.
CPC ...... *G05B 19/0423* (2013.01); *B23Q 11/0046* (2013.01); *G05B 2219/25274* (2013.01)

(58) Field of Classification Search
CPC ...... G05B 19/0423; G05B 2219/25274; B23Q 11/0046
See application file for complete search history.

(56) References Cited

U.S. PATENT DOCUMENTS

| 3,626,545 A | 12/1971 | Sparrow |
| 4,306,329 A | 12/1981 | Yokoi |

(Continued)

FOREIGN PATENT DOCUMENTS

| CA | 2786726 A1 | 11/2005 |
| CN | 201086970 Y | 7/2008 |

(Continued)

OTHER PUBLICATIONS

Instagram, Toolpig—Tools Carpentry Construction on Instagram, <https://www.instagram.com/p/BUchhjBgtmP/> published May 23, 2017, 1 page.
(Continued)

*Primary Examiner* — Christopher E. Everett
(74) *Attorney, Agent, or Firm* — Michael Best & Friedrich LLP

(57) ABSTRACT

Methods and systems are provided for a power tool in control of a vacuum. In response to activation input, the power tool controls a motor for driving power tool operation and wirelessly transmits a control signal to a vacuum. In response to receiving the control signal, the vacuum controls a motor for driving operation of the vacuum. The power tool, the vacuum, or both include a wireless communication pairing butting for paring the power tool and the vacuum. The power tool and/or the vacuum may be cordless and powered by a battery pack.

20 Claims, 8 Drawing Sheets

Related U.S. Application Data continuation of application No. 16/584,411, filed on Sep. 26, 2019, now Pat. No. 11,360,450, which is a continuation of application No. 15/955,915, filed on Apr. 18, 2018, now Pat. No. 10,444,720.

(60) Provisional application No. 62/528,631, filed on Jul. 5, 2017.

(56) References Cited

U.S. PATENT DOCUMENTS

| | | |
|---|---|---|
| 5,120,983 A | 6/1992 | Sämann |
| 5,256,906 A | 10/1993 | Tsuge et al. |
| 5,274,878 A | 1/1994 | Radabaugh et al. |
| 5,606,767 A | 3/1997 | Crlenjak et al. |
| 5,709,007 A | 1/1998 | Chiang |
| 5,839,156 A | 11/1998 | Park et al. |
| 5,903,462 A | 5/1999 | Wagner et al. |
| 5,991,885 A | 11/1999 | Chang et al. |
| 6,044,519 A | 4/2000 | Hendrix |
| 6,222,285 B1 | 4/2001 | Haley et al. |
| 6,424,799 B1 | 7/2002 | Gilmore |
| 6,536,536 B1 | 3/2003 | Gass et al. |
| 6,607,041 B2 | 8/2003 | Suzuki et al. |
| 6,615,930 B2 | 9/2003 | Bongers-Ambrosius et al. |
| 6,675,196 B1 | 1/2004 | Kronz |
| 6,834,730 B2 | 12/2004 | Gass et al. |
| 6,836,614 B2 | 12/2004 | Gilmore |
| 6,845,279 B1 | 1/2005 | Gilmore et al. |
| 6,851,900 B2 | 2/2005 | Tillemans et al. |
| 6,913,087 B1 | 7/2005 | Brotto et al. |
| 6,967,972 B1 | 11/2005 | Volftsun et al. |
| 7,036,605 B2 | 5/2006 | Suzuki et al. |
| 7,036,703 B2 | 5/2006 | Grazioli et al. |
| 7,040,972 B2 | 5/2006 | Hoffmann et al. |
| 7,054,696 B2 | 5/2006 | Crowell |
| 7,093,668 B2 | 8/2006 | Gass et al. |
| 7,102,303 B2 | 9/2006 | Brotto |
| 7,112,934 B2 | 9/2006 | Gilmore |
| 7,121,358 B2 | 10/2006 | Gass et al. |
| 7,243,152 B2 | 7/2007 | Guggisberg |
| 7,296,323 B2 | 11/2007 | Hayama et al. |
| 7,298,240 B2 | 11/2007 | Lamar |
| 7,328,752 B2 | 2/2008 | Gass et al. |
| 7,330,129 B2 | 2/2008 | Crowell et al. |
| 7,346,406 B2 | 3/2008 | Brotto et al. |
| 7,346,422 B2 | 3/2008 | Tsuchiya et al. |
| 7,391,326 B2 | 6/2008 | Puzio et al. |
| 7,437,204 B2 | 10/2008 | Lev-Ami et al. |
| 7,540,334 B2 | 6/2009 | Gass et al. |
| 7,613,590 B2 | 11/2009 | Brown |
| 7,646,155 B2 | 1/2010 | Woods et al. |
| 7,688,028 B2 | 3/2010 | Phillips et al. |
| 7,721,006 B2 | 5/2010 | Morrow |
| 7,723,952 B2 | 5/2010 | Phillips et al. |
| 7,750,811 B2 | 7/2010 | Puzio et al. |
| 7,809,495 B2 | 10/2010 | Leufen |
| 7,834,566 B2 | 11/2010 | Woods et al. |
| 7,868,591 B2 | 1/2011 | Phillips et al. |
| 7,896,098 B2 | 3/2011 | Suzuki et al. |
| 7,928,673 B2 | 4/2011 | Woods et al. |
| 7,953,965 B2 | 5/2011 | Qin et al. |
| 8,004,664 B2 | 8/2011 | Etter et al. |
| 8,005,647 B2 | 8/2011 | Armstrong et al. |
| 8,169,298 B2 | 5/2012 | Wiesner et al. |
| 8,210,275 B2 | 7/2012 | Suzuki et al. |
| 8,294,424 B2 | 10/2012 | Bucur |
| 8,310,206 B2 | 11/2012 | Bucur |
| 8,443,485 B2 | 5/2013 | Kunz et al. |
| 8,561,623 B2 | 10/2013 | Lowenstein |
| 8,800,103 B2 | 8/2014 | Hong et al. |
| 9,055,033 B2 | 6/2015 | Mergener |
| 9,073,160 B2 | 7/2015 | Appel et al. |
| 9,108,285 B2 | 8/2015 | Usselman |
| 9,189,663 B2 | 11/2015 | Goren et al. |
| 9,406,915 B2 | 8/2016 | White et al. |
| 9,430,370 B2 | 8/2016 | Mergener |
| 9,466,198 B2 | 10/2016 | Burch et al. |
| 9,537,335 B2 | 1/2017 | Furui et al. |
| 9,608,472 B2 | 3/2017 | Moshfeghi |
| 9,652,217 B2 | 5/2017 | Winkler et al. |
| 9,700,997 B2 | 7/2017 | Schlegel et al. |
| 9,710,373 B2 | 7/2017 | Mergener |
| 9,723,959 B2 | 8/2017 | Suzuki |
| 9,756,402 B2 | 9/2017 | Stampfl et al. |
| 9,906,045 B2 | 2/2018 | Kim et al. |
| 9,916,739 B2 | 3/2018 | Suzuki |
| 9,962,781 B2 | 5/2018 | Suzuki |
| 10,039,137 B2 | 7/2018 | Nguyen |
| 10,380,883 B2 | 8/2019 | Matson et al. |
| 10,510,199 B2 | 12/2019 | Hoossainy et al. |
| 10,646,982 B2 | 5/2020 | Dey, IV et al. |
| 2001/0052416 A1 | 12/2001 | Wissmach et al. |
| 2002/0143411 A1 | 10/2002 | Varone et al. |
| 2002/0153855 A1 | 10/2002 | Song et al. |
| 2003/0033686 A1 | 2/2003 | Liu |
| 2003/0172310 A1 | 9/2003 | Moyer |
| 2004/0060145 A1 | 4/2004 | Hayama et al. |
| 2004/0093682 A1 | 5/2004 | Litomisky et al. |
| 2004/0199364 A1 | 10/2004 | Law |
| 2004/0213868 A1 | 10/2004 | Hinzpeter et al. |
| 2005/0114718 A1 | 5/2005 | Ito |
| 2005/0195930 A1 | 9/2005 | Spital |
| 2005/0221739 A1 | 10/2005 | Hoffmann et al. |
| 2005/0237189 A1 | 10/2005 | Tani |
| 2005/0279213 A1 | 12/2005 | Otto |
| 2006/0095158 A1 | 5/2006 | Lee et al. |
| 2006/0261749 A1 | 11/2006 | Campbell |
| 2006/0293788 A1 | 12/2006 | Pogodin |
| 2007/0283521 A1 | 12/2007 | Foster et al. |
| 2008/0022479 A1 | 1/2008 | Zhao |
| 2008/0287062 A1 | 11/2008 | Claus et al. |
| 2009/0024757 A1 | 1/2009 | Proctor |
| 2009/0058361 A1 | 3/2009 | John |
| 2009/0076656 A1 | 3/2009 | Lutz et al. |
| 2009/0217483 A1 | 9/2009 | Lee et al. |
| 2009/0241283 A1 | 10/2009 | Loveless et al. |
| 2009/0250364 A1 | 10/2009 | Gerold et al. |
| 2009/0251330 A1 | 10/2009 | Gerold et al. |
| 2009/0254203 A1 | 10/2009 | Gerold et al. |
| 2009/0327543 A1 | 12/2009 | Teggatz et al. |
| 2010/0096151 A1 | 4/2010 | Ostling |
| 2010/0176766 A1 | 7/2010 | Brandner et al. |
| 2010/0199453 A1 | 8/2010 | Brotto et al. |
| 2011/0015764 A1 | 1/2011 | Chen et al. |
| 2011/0056716 A1 | 3/2011 | Jonsson et al. |
| 2011/0073343 A1 | 3/2011 | Sawano et al. |
| 2011/0114345 A1 | 5/2011 | Schlesak et al. |
| 2012/0073077 A1 | 3/2012 | Ishikawa et al. |
| 2012/0083298 A1 | 4/2012 | Park et al. |
| 2012/0100803 A1 | 4/2012 | Suumäki et al. |
| 2012/0104991 A1 | 5/2012 | Suzuki et al. |
| 2012/0187851 A1 | 7/2012 | Huggins et al. |
| 2012/0238119 A1 | 9/2012 | Rejman et al. |
| 2012/0302101 A1 | 11/2012 | Brotto et al. |
| 2012/0312570 A1 | 12/2012 | Wanek et al. |
| 2012/0325507 A1 | 12/2012 | Fluhrer et al. |
| 2013/0005246 A1 | 1/2013 | Waters et al. |
| 2013/0068255 A1 | 3/2013 | Heger |
| 2013/0241699 A1 | 9/2013 | Covaro |
| 2013/0257360 A1 | 10/2013 | Singh |
| 2013/0288599 A1 | 10/2013 | Bernard et al. |
| 2013/0331973 A1 | 12/2013 | Clark et al. |
| 2014/0008087 A1 | 1/2014 | Brown et al. |
| 2014/0025834 A1 | 1/2014 | Mergener |
| 2014/0107853 A1 | 4/2014 | Ashinghurst et al. |
| 2014/0151079 A1 | 6/2014 | Furui et al. |
| 2014/0158389 A1 | 6/2014 | Ito et al. |
| 2014/0191664 A1 | 7/2014 | Johnson et al. |
| 2014/0213179 A1 | 7/2014 | Rosenberg |
| 2014/0237753 A1 | 8/2014 | Conrad |
| 2014/0261551 A1 | 9/2014 | Usselman |
| 2014/0304939 A1 | 10/2014 | Suzuki |
| 2014/0315487 A1 | 10/2014 | Lu |

(56) References Cited

U.S. PATENT DOCUMENTS

| | | |
|---|---|---|
| 2014/0337952 A1 | 11/2014 | Bahr et al. |
| 2015/0070142 A1 | 3/2015 | Miki et al. |
| 2015/0162646 A1 | 6/2015 | Kawase et al. |
| 2015/0239086 A1 | 8/2015 | Lee |
| 2016/0049697 A1 | 2/2016 | McGee |
| 2016/0085253 A1 | 3/2016 | Knight et al. |
| 2016/0094080 A1 | 3/2016 | Dong |
| 2016/0100724 A1 | 4/2016 | Valentini |
| 2016/0151846 A1 | 6/2016 | Suzuki |
| 2016/0175895 A1 | 6/2016 | Suzuki |
| 2016/0311094 A1 | 10/2016 | Mergener et al. |
| 2016/0342142 A1 | 11/2016 | Boeck et al. |
| 2016/0367266 A1 | 12/2016 | Palmerton et al. |
| 2017/0057040 A1 | 3/2017 | Rzasa et al. |
| 2017/0153631 A1 | 6/2017 | Jonsson |
| 2017/0193761 A1 | 7/2017 | Suzuki |
| 2017/0201853 A1 | 7/2017 | Chen et al. |
| 2017/0201886 A1 | 7/2017 | Yang et al. |
| 2017/0257472 A1 | 9/2017 | Gehring et al. |
| 2017/0300406 A1 | 10/2017 | Mergener |
| 2017/0326696 A1 | 11/2017 | Halverson |
| 2018/0126537 A1 | 5/2018 | Tanaka et al. |
| 2018/0229317 A1 | 8/2018 | Suzuki |
| 2019/0011892 A1 | 1/2019 | Post et al. |
| 2019/0022775 A1 | 1/2019 | Suzuki |
| 2019/0067756 A1 | 2/2019 | Lee et al. |
| 2019/0097469 A1 | 3/2019 | Watanabe |

FOREIGN PATENT DOCUMENTS

| | | |
|---|---|---|
| CN | 101234012 A | 8/2008 |
| CN | 101866169 A | 10/2010 |
| CN | 102490172 A | 6/2012 |
| CN | 203042139 U | 7/2013 |
| CN | 104076700 A | 10/2014 |
| CN | 204241870 U | 4/2015 |
| CN | 106385661 A | 2/2017 |
| CN | 106909156 A | 6/2017 |
| DE | 8808570 U1 | 10/1988 |
| DE | 102012003073 A1 | 8/2013 |
| DE | 102012003077 A1 | 8/2013 |
| DE | 102013222313 A1 | 5/2015 |
| DE | 202017104107 A1 | 7/2017 |
| EP | 0371236 A2 | 6/1990 |
| EP | 1016946 B1 | 5/2006 |
| EP | 2229857 A2 | 9/2010 |
| EP | 2233993 A1 | 9/2010 |
| EP | 2628427 A2 | 8/2013 |
| EP | 2628428 A2 | 8/2013 |
| EP | 2628431 A2 | 8/2013 |
| EP | 2687331 A1 | 1/2014 |
| EP | 2878249 A1 | 6/2015 |
| EP | 2946710 A2 | 11/2015 |
| EP | 2962813 A1 | 1/2016 |
| EP | 3159114 A1 | 4/2017 |
| EP | 3272261 A2 | 1/2018 |
| EP | 3272467 A2 | 1/2018 |
| EP | 3415066 A1 | 12/2018 |
| EP | 3528213 A1 | 8/2019 |
| JP | H07222756 A | 8/1995 |
| JP | 2001137158 A | 5/2001 |
| JP | 2001161607 A | 6/2001 |
| JP | 2002209818 A | 7/2002 |
| JP | 2002224631 A | 8/2002 |
| JP | 2005102791 A | 4/2005 |
| JP | 2007063846 A | 3/2007 |
| JP | 2007301344 A | 11/2007 |
| JP | 2008000739 A | 1/2008 |
| JP | 2008220567 A | 9/2008 |
| JP | 2009083043 | 4/2009 |
| JP | 4550357 B2 | 9/2010 |
| JP | 2011079082 A | 4/2011 |
| JP | 4955332 B2 | 6/2012 |
| JP | 2014057635 A | 4/2014 |
| JP | 2014525840 A | 10/2014 |
| JP | 5828110 B2 | 12/2015 |
| JP | 2016209997 A | 12/2016 |
| JP | 2018069445 A | 5/2018 |
| KR | 0175512 B1 | 2/1999 |
| KR | 200321249 Y1 | 7/2003 |
| KR | 100725516 B1 | 6/2007 |
| KR | 100833125 B1 | 5/2008 |
| WO | WO2004010253 A2 | 1/2004 |
| WO | WO2007090258 A1 | 8/2007 |
| WO | WO2008064952 A1 | 6/2008 |
| WO | WO2010085637 A1 | 7/2010 |
| WO | WO2011115121 A1 | 9/2011 |
| WO | WO2012027739 A2 | 3/2012 |
| WO | WO2012031925 A1 | 3/2012 |
| WO | WO2012061673 A2 | 5/2012 |
| WO | WO2015162193 A1 | 10/2015 |
| WO | WO2017075547 A1 | 5/2017 |
| WO | WO2017171609 A1 | 10/2017 |
| WO | WO2018162233 A1 | 9/2018 |
| WO | WO2018177623 A1 | 10/2018 |
| WO | WO2018180896 A1 | 10/2018 |

OTHER PUBLICATIONS

Instagram, Toolpig—Tools Carpentry Construction on Instagram, <https://www.instagram.com/p/BUR9YHFgr3N/?hl=en> published May 19, 2017, 1 page.

Makita, Auto-Start Wireless System, <https://www.makitatools.com/aws>, 2018 [website accessed Jan. 25, 2018] 6 pages.

Makita, Makita Tools 2017 New Product Launch Event, <http://www.coptool.com/makita-2017-new-products-event/> published May 22, 2017, 14 pages.

ToolGuyD, New Makita 18V X2 Brushlees Miter Saw with Remote Dust Vac Trigger, <https://toolguyd.com/makita-18v-x2-brushless-miter-saw-xsl06-with-bluetooth-dust-collection-activation/> published May 24, 2017, 15 pages.

Youtube, Coptool—Makita 18v LXT X2 Brushless 10" Miter Saw XSL06 & Corded LS1019L, <https://www.youtube.com/watch?v=-lqr26tB6Fg> published May 22, 2017, 9 pages.

International Search Report and Written Opinion for Application No. PCT/US2013/050946 dated Jan. 22, 2014 (9 pages).

German Patent Office Action for Application No. 112013003581.2 with English Translation dated Apr. 10, 2017 (15 pages).

International Search Report and Written Opinion for Application No. PCT/US2018/028072 dated Aug. 6, 2018, 12 pages.

United States Patent Office Final Rejection for U.S. Appl. No. 15/955,915 dated Dec. 21, 2018, 44 pages.

Taiwan Patent Office Action for Application No. 10820388720 dated Apr. 29, 2019, 14 pages.

Chiueh et al., "A Networked Robot System for Wireless Network Emulation." In Proceedings of the 1st international conference on Robot communication and coordination, IEEE Press, 2007, 8 pages.

Domnitcheva, "Smart Vacuum Cleaner—An Autonomous Location-Aware Cleaning Device." In Proceedings of the 6th International Conference on Ubiquitous Computing, Tokyo, Japan, 2004, 2 pages.

Infinity Cutting Tools, "iVac Automated Dust Collection-Carbide Router Bits." <https://www.infinitytools.com/iVac-Automated-Dust-Collection/departments/1789/> webpage available as early as Mar. 8, 2013, 2 pages.

MBright Tools, "iVAC Pro User Guide." <https://web.archive.org/web/20110415084930/http://www.ivacswitch.com/default.action?itemid =25> webpage available as early as Apr. 15, 2011, 66 pages.

MBright Tools, "Overview of the iVAC Pro System." <https://web.archive.org/web/20110415084949/http://www.ivacswitch.com/default.action?itemid =35> webpage available as early as Apr. 15, 2011, 1 page.

Bluetooth, "Specification of the Bluetooth System." Version 4.0 vol. 0., published Jun. 30, 2010, 2302 pages.

European Patent Office Extended Search Report for Application No. 18190808.8 dated Jan. 18, 2019 (7 pages).

European Patent Office Extended Search Report for Application No. 19189302.2 dated Jan. 3, 2020 (8 pages).

United Kingdom Intellectual Property Office Examination Report for Application No. 1501111.7 dated Jan. 20, 2020 (3 pages).

(56) References Cited

OTHER PUBLICATIONS

Extended European Search Report for Application No. 18827650.5 dated Mar. 1, 2021 (8 pages).
Chinese Patent Office Action for Application No. 201880057781.4 dated Feb. 26, 2021 (11 pages including English summary).
Chinese Patent Office Action for Application No. 201880057781.4 dated Nov. 19, 2021 (6 pages including statement of relevance).

ADAPTERS FOR COMMUNICATION BETWEEN POWER TOOLS

RELATED APPLICATIONS

This application is a continuation of U.S. patent application Ser. No. 17/837,580, filed Jun. 10, 2022, which is a continuation of U.S. patent application Ser. No. 16/584,411, filed Sep. 26, 2019, which is a continuation of U.S. patent application Ser. No. 15/955,915, filed on Apr. 18, 2018, which claims the benefit of U.S. Provisional Patent Application No. 62/528,631, filed on Jul. 5, 2017, the entire content of each of which is herein incorporated by reference.

TECHNICAL FIELD

Embodiments described herein relate to power tools. More specifically, embodiments described herein relate to a power tool in communication with a vacuum.

SUMMARY

The ability to activate or deactivate a tool in response to the activation or deactivation of another tool can hold several potential benefits for a user. For example, a vacuum activating automatically in response to an activation of a saw or drill motor can improve dust removal in a working environment and reduce user fatigue and effort to manually enable the vacuum. Some embodiments enable detection of activation of a first tool, wireless communication of signals indicating the activation of the first tool, and responsive activation of a second tool. Some embodiments enable detection of deactivation of a first tool, wireless communication of signals indicating the deactivation of the first tool, and responsive deactivation of a second tool. Some embodiments include the use of one or more removably coupled communication adapters to enable the detection, wireless communication, and activation/deactivation, which enables user customization of tool-to-tool interactions across a variety of tools.

In some embodiments, a system is provided for a power tool in control of a vacuum operation. The system includes a power tool having a power tool activation input, a first power interface, a first motor for driving operation of the power tool, a first wireless communication hardware, and a first pairing button. A first electronic controller includes a first electronic processor that is communicatively coupled to a first memory, the power tool activation input, the first motor, and the first wireless communication hardware. The system also has a vacuum that includes a vacuum power enable input, a second power interface, a second motor for driving operation of the vacuum, a second wireless communication hardware, and a second pairing button for wirelessly pairing the vacuum and the power tool for wireless communication. The vacuum also has a second electronic controller including a second electronic processor that is communicatively coupled to a second memory, the vacuum enable input, the second motor, the second wireless communication hardware, and the pairing button. The vacuum further includes a suction inlet connectable to the power tool. The first memory of the power tool includes instructions that when executed by the first electronic processor cause the first electronic processor to, in response to input received via the power tool activation input, control the first motor for driving operation of the power tool and transmit a control signal via the first wireless communication hardware to the vacuum. The second memory of the vacuum includes instructions that when executed by the second electronic processor cause the second electronic processor to, in response to receiving the control signal via the second wireless communication hardware of the vacuum, control the second motor.

In some embodiments, a method is provided for a power tool in control of a vacuum operation. The method includes, in response to actuation of a pairing button of a vacuum, broadcasting, by the vacuum, a pairing identification signal; detecting, by the power tool, the pairing identification signal; and pairing, by the vacuum and the power tool, based on detecting the pairing identification signal. In response to receiving input via a power tool activation input, a first electronic processor of the power tool controls a first motor for driving operation of the power tool, and transmits a control signal via a first wireless communication hardware to a vacuum, wherein the first electronic processor is communicatively coupled to a first memory. In response to receiving the control signal via a second wireless communication hardware of the vacuum, a second electronic processor of the vacuum controls a second motor for driving operation of the vacuum, wherein the second electronic processor is communicatively coupled to a second memory.

In some embodiments, a system is provided for controlling operation of a second electronic tool in response to communication from a first electronic tool. The system includes a first electronic tool that includes a user input, a first motor for driving operation of the first electronic tool, first wireless communication hardware, and a first electronic controller. The first electronic controller includes a first electronic processor that is communicatively coupled to a first memory, the first tool activation input, the first motor, and the first wireless communication hardware. The system further includes a second electronic tool that includes a second electronic tool power enable input, a second motor for driving operation of the second electronic tool, a second wireless communication hardware, a pairing button for wirelessly pairing the second electronic tool and the first electronic tool for wireless communication. The second electronic tool further includes a second electronic controller including a second electronic processor that is communicatively coupled to a second memory, the second tool power enable input, the second motor, the second wireless communication hardware, and the pairing button. In response to input received via the first user input, the first electronic processor controls the first motor for driving operation of the first electronic tool and transmits a signal to the second electronic tool. In response to receiving the signal via the second wireless communication hardware of the second electronic tool, the second electronic processor controls the second motor for driving operation of the second electronic tool.

In some embodiments, a first method for tool-to-tool communication is provided that includes detecting, by a first controller of a first communication adapter, operation of a first electronic tool. In response to the detection, the controller broadcasts an activation signal. A second controller of a second communication adapter detects the activation signal broadcast by the first controller. In response to the detection of the activation signal, the second communication adapter controls a second electronic tool.

In some embodiments, a second method for tool-to-tool communication is provided that includes detecting, by a first controller of a first communication adapter, deactivation of a first electronic tool. In response to the detection, the controller broadcasts a deactivation signal. A second controller of a second communication adapter detects the deactivation signal broadcast by the first controller. In response to the detection of the deactivation signal, the second communication adapter controls a second electronic tool.

In some embodiments, the second method is executed following the first method, such that the step of detecting, by the first controller, deactivation of the first electronic tool occurs subsequent to the step of controlling, by the second communication adapter, the second electronic tool in response to detection of the activation signal.

In some embodiments, a first tool-to-tool communication system is provided that includes a first electronic tool system having a first electronic tool and a first communication adapter removably coupled to a power interface of the first electronic tool, and a second electronic tool system having a second electronic tool and a second communication adapter. A first controller of the first communication adapter is configured to detect operation of the first electronic tool and, in response to the detection, broadcast an activation signal. A second controller of the second communication adapter is configured to detect the activation signal broadcast by the first controller. In response to the detection of the activation signal, the second communication adapter controls the second electronic tool.

In some embodiments, the first controller of the first communication adapter is configured to detect deactivation of the first electronic tool and, in response to the detection, broadcast a deactivation signal. Additionally, the second controller of the second communication adapter is configured to detect the deactivation signal broadcast by the first controller. In response to the detection of the deactivation signal, the second communication adapter controls the second electronic tool.

In some embodiments, a second tool-to-tool communication system is provided that includes a first electronic tool system having a first electronic tool and a first communication adapter removably coupled to a power interface of the first electronic tool, and a second electronic tool system having a second electronic tool and a second communication adapter. A first controller of the first communication adapter is configured to detect deactivation of the first electronic tool and, in response to the detection, broadcast a deactivation signal. A second controller of the second communication adapter is configured to detect the deactivation signal broadcast by the first controller. In response to the detection of the deactivation signal, the second communication adapter controls the second electronic tool.

In some embodiments of the above systems, the second communication adapter is removably coupled to a power interface of the second electronic tool, such as a battery pack interface or an alternating current (AC) power cord. In some embodiments, the second communication adapter is integrated into the second electronic tool, for example, electrically between a power interface of the second electronic tool and a load of the second electronic tool.

Other aspects of the invention will become apparent by consideration of the detailed description and accompanying drawings.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
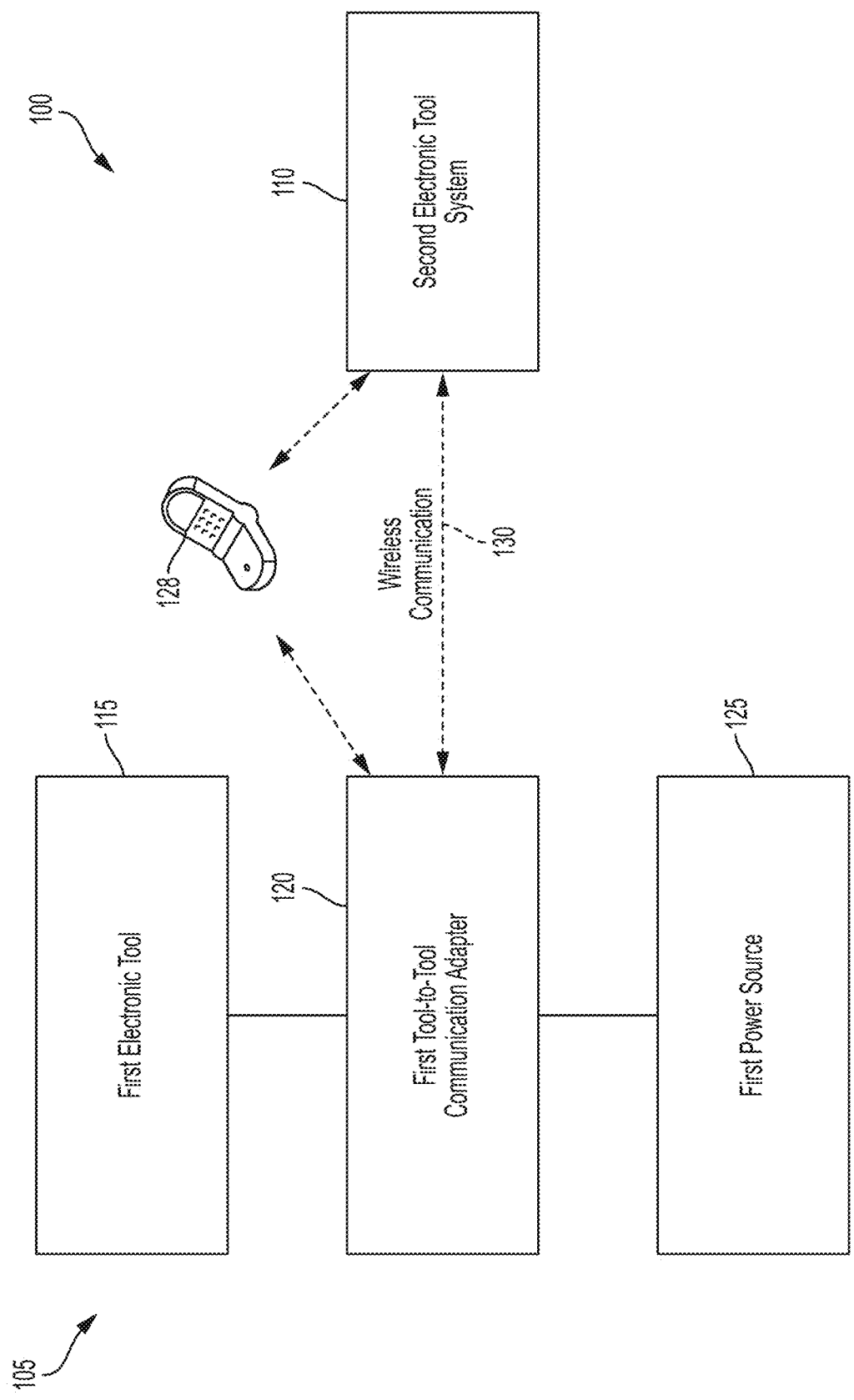
FIG. 1 illustrates a tool-to-tool communication system.

FIG. 1 illustrates a tool-to-tool communication system 100. The system 100 includes a first electronic tool system 105 and a second electronic tool system 110. The first electronic tool system 105 includes a first electronic tool 115, a first tool-to-tool communication adapter 120 (also referred to as the first adapter or the first communication adapter 120), and a first power source 125. In some embodiments, the system 100 further includes a personal mobile device 128. The first adapter 120 is configured to be removably coupled to the first electronic tool 115 and to the first power source 125. The first adapter 120 is configured to wirelessly communicate with the second electronic tool system 110 via a wireless communication link 130. Although illustrated as a bi-directional communication link, in some embodiments, the wireless communication link 130 is unidirectional either from the first adapter 120 to the second electronic tool system 110 or from the second electronic tool system 110 to the first adapter 120. Additionally, in some embodiments, first adapter 120 and the second electronic tool system 110 are configured to wirelessly communicate, unidirectionally or bidirectionally, with the personal mobile device 128.

The first electronic tool 115 is, for example, a power tool, fluid flow control devices, an electronic test and measurement device, a work site radio, or work flood light. Power tools can include drills, circular saws, jig saws, band saws, table saws, chop saws, miter saws, reciprocating saws, angle grinders, straight grinders, hammers, multi-tools, impact wrenches, rotary hammers, drill-drivers, hammer drill-drivers, impact drivers, angle drills, belt sanders, orbital sanders, planers, pipe cutters, grease guns, vacuum cleaners, outdoor power equipment (such as blowers, chain saws, edgers, hedge trimmers, lawn mowers, or trimmers), and the like. Electronic test and measurement devices can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include wet/dry vacuums, dust removal vacuums connectable to power tools (e.g., saws or sanders), stick vacuums, hand vacuums, upright vacuums, carpet cleaners, hard surface cleaners, canister vacuums, broom vacuums, and the like. Fluid flow control devices can include motorized water pumps, electronically controllable water flow valves, and the like.

In some embodiments, the first power source 125 is a removable and rechargeable power tool battery pack operable with a suite of two or more of power tools, fluid flow control devices, test and measurement devices, work site radios, and work lights. The power tool battery pack includes a housing within which are one or more battery cells, which may be lithium ion ("Li-ion") cells, Nickel-Cadmium ("Ni-Cad") cells, or cells of another chemistry type. The cells, collectively, may provide nominal voltages of different values, depending on the pack. For example, the power tool battery pack may have a nominal output voltage of 4V, 12V, 18V, 28V, 36V, 40V, or other levels. In some embodiments, the first power source 125 is an alternating current (AC) power source, such as a standard AC outlet coupled to an AC power grid or AC generator. For instance, the AC source may include an approximately 120 V, 60 Hz power signal or an approximately 240 V, 50 Hz power signal.

Figure 2A:
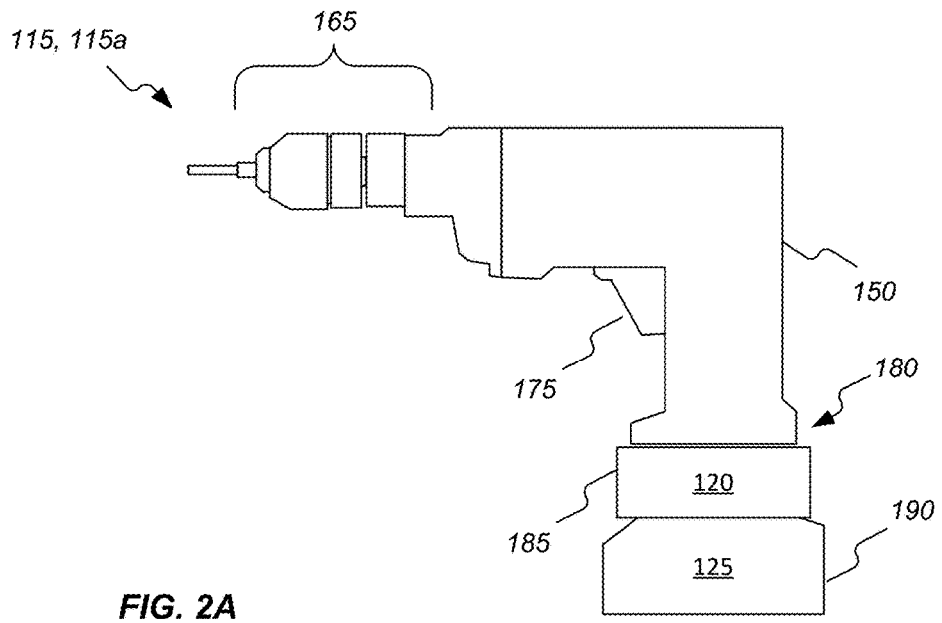
FIG. 2A illustrates an example first electronic tool of the system of FIG. 1.

FIG. 2A illustrates an example of the first electronic tool system 105 of FIG. 1. In this example, the first electronic tool 115 is a brushless hammer drill 115a having a housing 150, an output unit 165, a trigger 175, and a battery interface 180 (also referred to as a power interface). The battery interface 180 is configured to receive and electrically couple to a power tool battery pack, such as some embodiments of the first power source 125 of FIG. 1. However, in the embodiment of FIG. 2A, the first adapter 120 has an interface that mimics a power tool battery pack and is coupled to the battery interface 180, and has another interface that mimics the battery interface 180 and is coupled to the first power source 125 (in the form of a power battery pack). As illustrated, the adapter 120 including an adapter housing 185, which engages the battery interface 180, and the first power source 125 includes a pack housing 190, which engages the adapter housing 185.

Figure 2B:
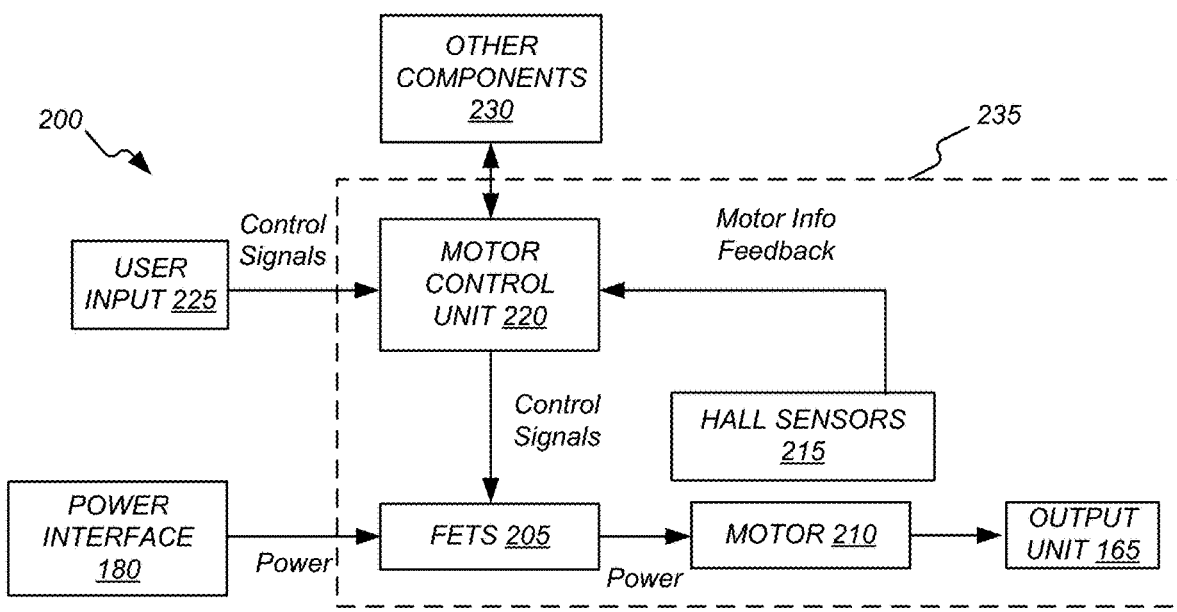
FIG. 2B illustrates a block diagram of an example first electronic tool of the system of FIG. 1.

FIG. 2B illustrates a block diagram 200 of the first electronic tool 115a, which includes the power interface 180, field effect transistors (FETs) 205, a motor 210, output unit 212, Hall sensors 215, a motor control unit 220, user input 225, and other components 230 (battery pack fuel gauge, work lights (LEDs), current/voltage sensors, etc.). The Hall sensors 215 provide motor information feedback, such as motor rotational position information, which can be used by the motor control unit 220 to determine motor position, velocity, and/or acceleration. The motor control unit 220 receives user controls from user input 225, such as by depressing the trigger 175 or shifting a forward/reverse selector of the first electronic tool 115. In response to the motor information feedback and user controls, the motor control unit 220 transmits control signals to accurately control the FETs 205 to drive the motor 210. By selectively enabling and disabling the FETs 205, power from the power interface 180 is selectively applied to the motor 210 to cause rotation of a rotor of the motor 210. The rotating rotor of the motor 210 drives the output unit 165. Although not shown, the motor control unit 220 and other components of the first electronic tool 115 are electrically coupled to and receive power from the power interface 180. The FETs 205, motor 210, Hall sensors 215, motor control unit 220, and output unit 165 may be referred to as electromechanical components 235 of the first electronic tool 115.

Although described with respect to the example of the hammer drill-driver 115a of FIG. 2A, the block diagram 200 generally applies to other embodiments of the first electronic tool 115. For example, the output unit 165 in the case of a power saw is a saw blade holder (for example, an arbor); the output unit 165 in the case of a vacuum is an impeller providing suction force; and the output unit 165 in the case of a water pump is a pumping mechanism. Further, in some embodiments of the first electronic tool 115, a brushed motor is provided as the motor 210 to drive the output unit 165. Additionally, some embodiments of the first electronic tool 115, such as electronic test and measurement devices, work flood light embodiments, and water flow control valves, do not include a motor for driving an output device. The block diagram 200 is modified for such embodiments. For example, the electromechanical components 235 are substituted with the appropriate electronics hardware for the relevant tool, such as a controller and lighting circuitry controlled by the controller (for a work flood light); a controller, sensing circuitry providing sensed data to the controller, and a display circuitry controlled by the controller to display the sensed data (for an electronic test and measurement device); or a controller, and a valve controlled by the controller (e.g., for a water flow control valve or pump).

Figure 3:
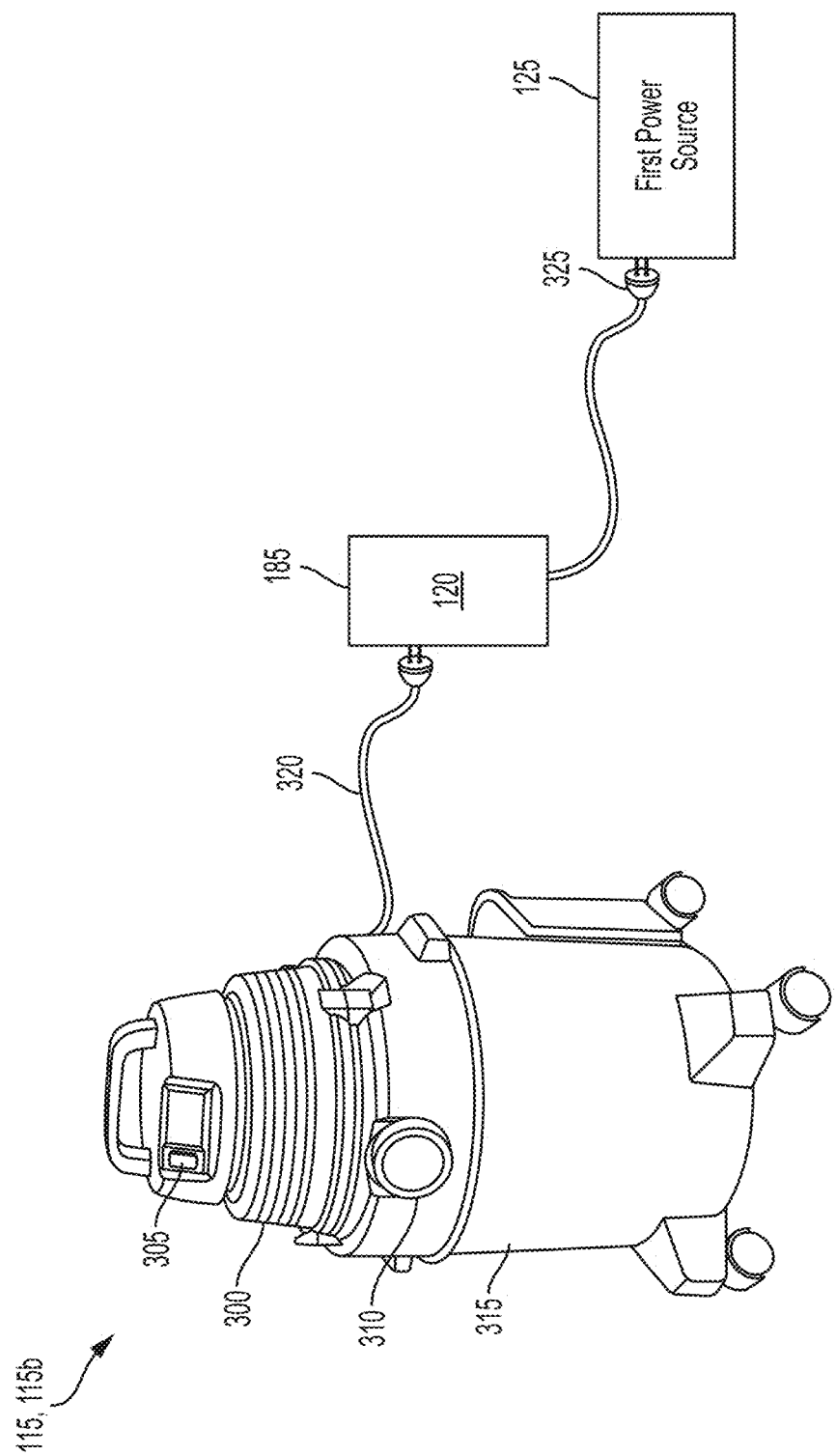
FIG. 3 illustrates another example first electronic tool of the system of FIG. 1.

FIG. 3 illustrates another example of the first electronic tool system 105 of FIG. 1. In this example, the first electronic tool 115 is a vacuum 115b, or dust removal vacuum, having a housing 300, a power switch 305 for turning on and off the vacuum, a suction inlet 310, a collection container 315, and a power cord 320 (also referred to as a power interface). The power cord 320 is coupled to the first adapter 120 which, in this embodiment, includes a plug 325 extending form the adapter housing 185 and for interfacing with the first power source 125. In this embodiment, the first power source 125 is an AC source. The diagram 200 of FIG. 2 described above similarly applies to the vacuum 115*b*. However, the power interface 180, in this example, is an AC power interface, such as the power cord 320.

Figure 4B:
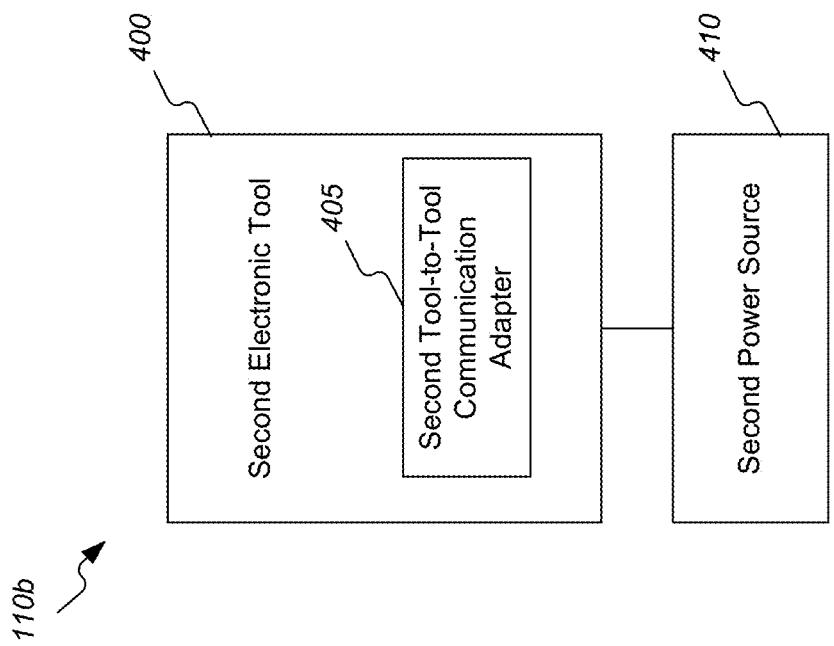
FIGS. 4A and 4B illustrate examples of a second electronic tool system of the system of FIG. 1.
Figure 4A:
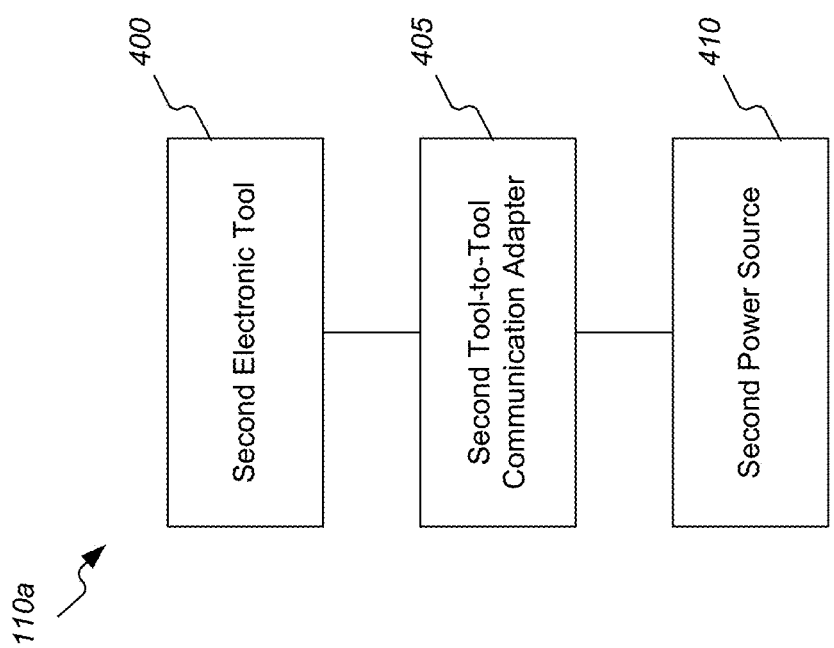

FIGS. 4A and 4B illustrate embodiments of the second electronic tool system 110, identified as a second electronic tool system 110*a* and a second electronic tool system 110*b*. The second electronic tool system 110*a* of FIG. 4A includes a second electronic tool 400, a second tool-to-tool communication adapter 405 (also referred to as the second adapter or second communication adapter 405), and a second power source 410. Similar to the first adapter 120, the second adapter 405 in FIG. 4A includes a housing (similar to the housing 185) and is configured to be removably coupled to the second electronic tool 400 and to the second power source 410. The above description of the first adapter 120 and its engagement with the power tool 115*a* and the power source 125, including as illustrated and described with respect to FIGS. 2A and 3, similarly apply to the second adapter 405 with respect to the second electronic tool 400 and the second power source 410. The second adapter 405 is also configured to wirelessly communicate with the first adapter 120 via the wireless communication link 130 (see FIG. 1).

The second electronic tool 400 is, for example (and like the first electronic tool 115), a power tool, a fluid flow control device, an electronic test and measurement device, a work site radio, or work flood light. The above description of the first electronic tool 115, including the examples listed above and the examples illustrated and described with respect to FIGS. 2A, 2B, and 3, similarly apply to the second electronic tool 400.

Similar to the first power source 125, in some embodiments, the second power source 410 is a removable and rechargeable power tool battery pack operable with a suite of two or more of power tools, fluid flow control devices, electronic test and measurement devices, work site radios, and work lights. Additionally, in some embodiments, the second power source 410 is an alternating current (AC) power source, such as a standard AC outlet coupled to an AC power grid or AC generator.

The second electronic tool system 110*b* of FIG. 4B is similar to the second electronic tool system 110*a* of FIG. 4A, but for the second adapter 405 being integrated into the second electronic tool 400 rather than removably coupled thereto. For example, the second adapter 405 is installed within a housing (similar to, for example, the housing 150 of FIG. 2A or the housing 300 of FIG. 3) of the second electronic tool 400, preventing simple attachment and detachment of the second adapter 405 by a user.

In some embodiments, the first electronic tool system 105 of FIG. 1 is similar to the second electronic tool system 110*b* of FIG. 4B, with the first adapter 120 integrated into the first electronic tool 115 rather than removably coupled thereto. For example, in contrast to FIG. 2A, the first adapter 120 is installed within the housing 150 of the first electronic tool 115,115*a*, preventing simple attachment and detachment of the first adapter 120 by a user.

Figure 5:
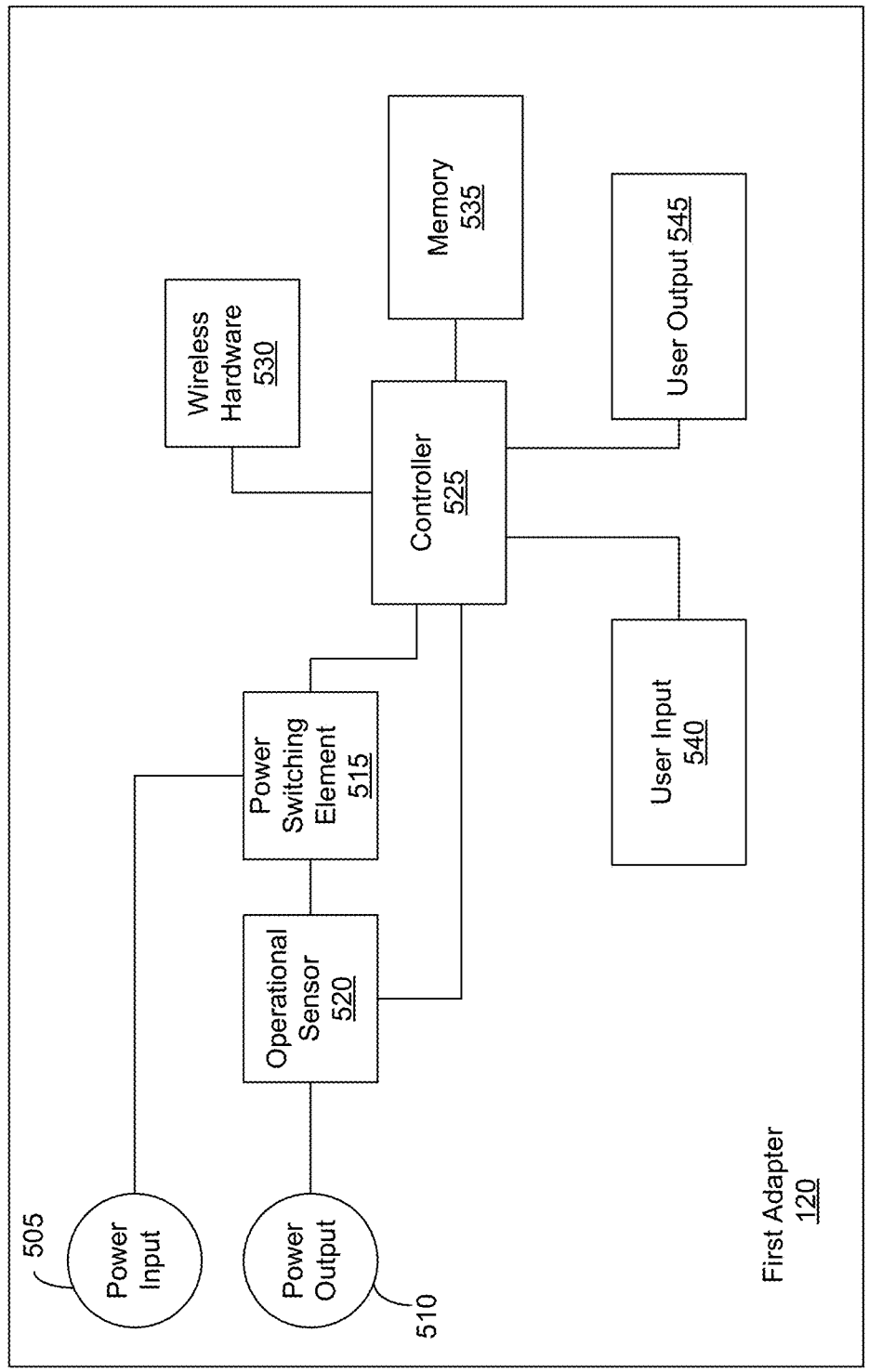
FIG. 5 illustrates a first tool-to-tool communication adapter of the system of FIG. 1.

FIG. 5 illustrates the first adapter 120 according to some embodiments. The first adapter 120 includes a power input 505 and a power output 510. The power input 505 includes, for example, electrical terminals for interfacing with a power source, such as the first power source 125 in the case of the first adapter 120. In other words, in some embodiments, the power input 505 receives AC power from an AC power source and, in other embodiments, the power input 505 receives DC power from a power tool battery pack.

The first adapter 120 further includes a power switching element 515, such as a FET or relay, and an operational sensor 520, such as a current or voltage sensor. The operational sensor 520 includes one or more sensors for detecting various operating conditions of a tool coupled to the power output 510, such as current drawn by the tool, as described in further detail below. In some instances, the operational sensor 520 includes a global positioning satellite (GPS) module to provide a location of the first adapter 120 or a strength-of-signal sensor in wireless communication with another wireless device, such as the first electronic tool 115 or the second electronic tool 400 described above, at a known position, to determine a relative location of the first adapter 120 with respect to the other wireless device. The power switching element 515 and the operational sensor 520 are coupled to a controller 525.

The controller 525 includes an electronic processor and is further coupled to wireless hardware 530, a memory 535, user input 540, and user output 545. The wireless hardware 530 is used for wireless communications, such as via the wireless communication link 130 or with the personal mobile device 128. The wireless hardware 530 may include an antenna and a transceiver for transmitting and receiving wireless communications via the antenna.

The memory 535 includes, among other elements, software that is executed by the electronic processor of the controller 525 to control the functions of the first adapter 120 described herein. The user input 540, which may include one or more of an actuating device (e.g., button, etc.), one or more selectors (e.g., pairing/command selector, light control, etc.), and other input elements (power toggle) to provide user commands to the controller 525 to indicate how the user desires the first adapter 120 to operate. The user output 545 includes one or more of LEDs, a speaker, a vibrating element, etc. to inform the user of the status of the first adapter 120. For instance, if an error occurs, such as low battery power, first adapter 120 may output an audible alert, an LED may flash, and/or the vibrating element may provide tactile feedback to the user.

In some embodiments, the first adapter 120 further includes power regulating and conversion circuitry (not shown) to ensure that the power provided to various components of the first adapter 120, the power output 510, or both, are at the appropriate levels.

In some embodiments, the first adapter 120 includes the operational sensor 520 in addition to the other components illustrated in FIG. 5, but not the power switching element 515. In some embodiments, the first adapter 120 includes the power switching element 515 in addition to the other components illustrated in FIG. 5, but not the operational sensor 520.

Figure 6:
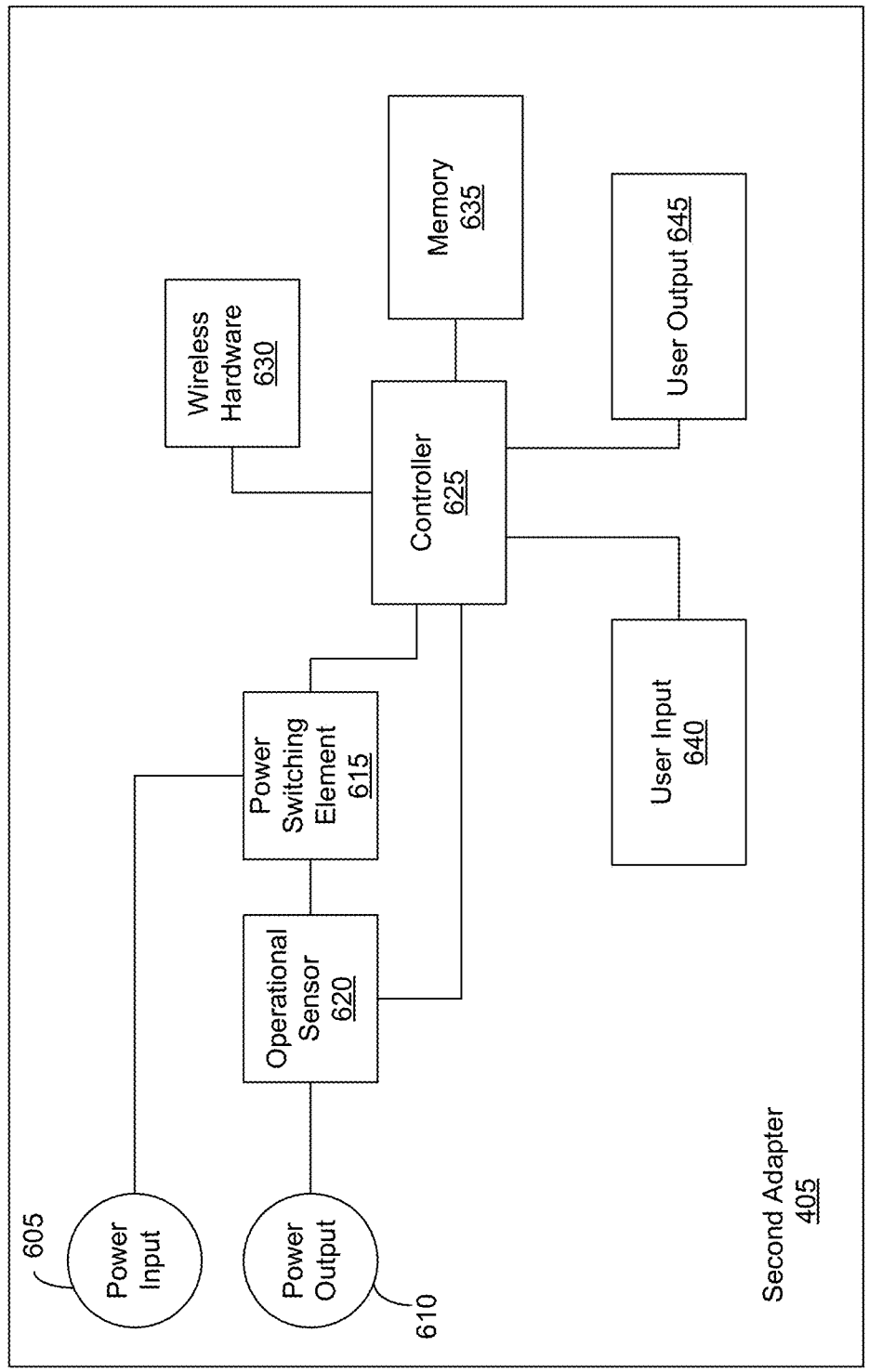
FIG. 6 illustrates a second tool-to-tool communication adapter of the second electronic tool system of the system of FIG. 1.

FIG. 6 illustrates the second adapter 405 according to some embodiments. The second adapter 405 includes components similar to the first adapter 120 and, accordingly, are provided with like names and labels plus 100 in FIG. 6, and the above described functions and arrangement of the components of the first adapter 120 in FIG. 5 similarly applies to the similarly named components of the second adapter 405 in FIG. 6. Similar to the first adapter 120, in some embodiments, the second adapter 405 includes the operational sensor 620 in addition to the other components illustrated in FIG. 6, but not the power switching element 615. In some embodiments, the second adapter 405 includes the power switching element 615 in addition to the other illustrated in FIG. 6, but not the operational sensor 620. Thus, in some embodiments, the first adapter 120 includes the operational sensor 520, but not the power switching element 515, while the second adapter 405 includes the power switching element 615, but not the operational sensor 620. Additionally, in some embodiments, the second adapter 405 includes the operational sensor 620, but not the power switching element 615, while the first adapter 120 includes the power switching element 515, but not the operational sensor 520.

In some embodiments, when the second adapter 405 is integrated into the second electronic tool 400, the adapter is inserted between a power interface at which power is received from an external power source (e.g., the second power source 410) and a motor or other load (e.g., lights, displays, sensing devices, radios). For example, with respect to the diagram 200 of FIG. 2, the second adapter 405 may be inserted between the power interface 180 and the FETS 205 such that the power input 605 is coupled to the power interface 180 and the power output 610 is coupled to the FETs 205.

Figure 7:
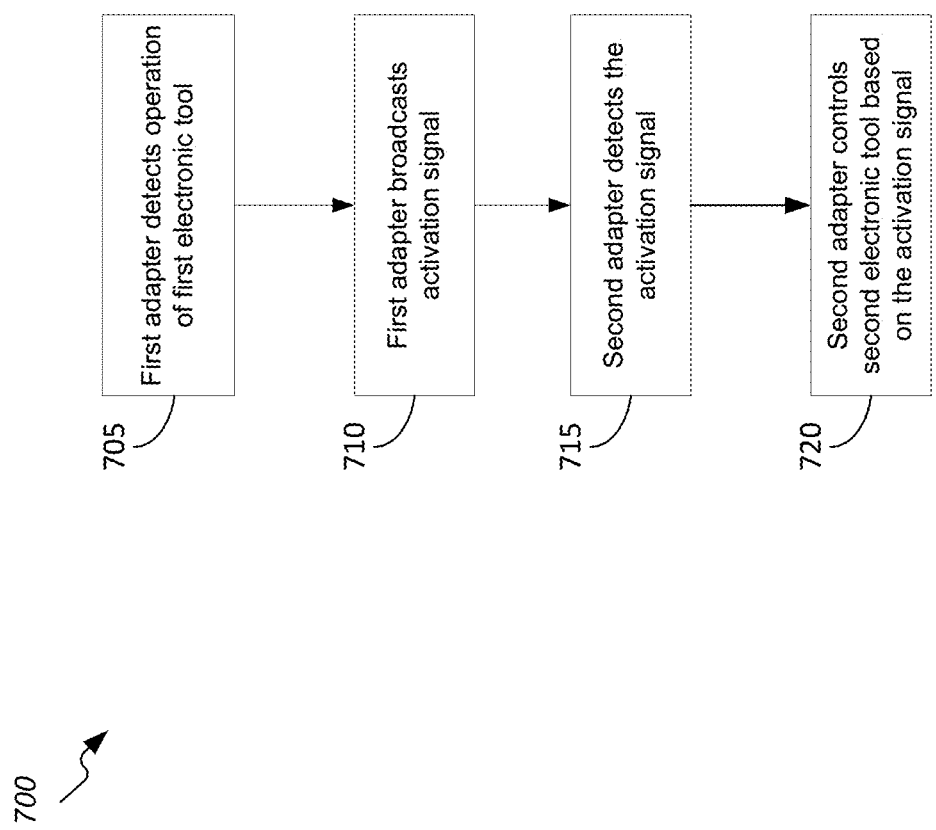
FIG. 7 illustrates a method of tool-to-tool communication.

FIG. 7 illustrates a method 700 of tool-to-tool communication. In some embodiments, the method 700 is implemented with one of the embodiments of the system 100 of FIG. 1 and, accordingly, the method 700 will be described with respect to the system 100. However, in some embodiments, the method 700 is implemented with other systems. In block 705, the controller 525 of the first adapter 120 (also referred to as a sensing adapter) detects operation of the first electronic tool 115. For example, in some embodiments, the operational sensor 520 of the first adapter 120 is a current sensor that detects current drawn from the first power source 125 by the first electronic tool 115 when the first electronic tool 115 is activated. For example, in response to activation of the first electronic tool 115 (e.g., via a trigger such as the trigger 175 of FIG. 2 or a power switch such as the power switch 305 of FIG. 3), the first electronic tool 115 draws current through the first adapter 120 (via the power input 505 and the power output 510), which is sensed by the operational sensor 520 and thereby detected by the controller 525 of the first adapter 120. The operational state (i.e., operating or not operating) of the first electronic tool 115 detected in block 705 may be referred to as an operational parameter of the first electronic tool 115.

In block 710, the controller 525 of the first adapter 120 broadcasts an activation signal. For example, the controller 525 broadcasts the activation signal wirelessly via the wireless hardware 530. The activation signal may include one or more of an indication of the operational state of first electronic tool 115 (e.g., indicating activation occurred) and a source identifier (e.g., an identity of the first adapter 120, an identity of the first electronic tool 115, or both). In some embodiments, the activation signal is broadcast by the first adapter 120 generally without a particular destination identifier. In some embodiments, the activation signal is broadcast by the first adapter 120 with a destination identifier, such as an identity of the second electronic tool system 110, which may be an identity of the second adapter 405 or the second electronic tool 410. In some embodiments, the activation signal broadcast by the first adapter 120 is transmitted via an existing communication link between the first adapter 120 and the second adapter 405 (e.g., a Bluetooth or Wi-Fi connection previously established).

In block 715, the controller 625 of the second adapter 405 (also referred to as a switching adapter) detects the activation signal broadcast by the first adapter 120. For example, the activation signal may be received by the wireless hardware 630 of the second adapter 405 (over the wireless link 130) and forwarded to the controller 625 of the second adapter 405. The controller 625, in turn, determines that the activation signal is from the first electronic tool system 105, for example, based on a match of the source identifier of the activation signal with an identifier stored in the memory 635. In the event that an activation signal is received in block 715 that is from another device having a source identifier that does not match with an identifier stored in the memory 635, the controller 625 may exit the method 700 (i.e., bypass block 720) or loop back to block 715 to await detection of another activation signal. Accordingly, activation signals from unassociated devices received by the second adapter 405 may be dismissed.

In block 720, the controller 625 of the second adapter 405 controls the second electronic tool 400 based on the activation signal detected in block 715. In some embodiments, controlling the second electronic tool 400 in block 720 includes the second adapter 405 activating the second electronic tool 400. For example, the controller 625 controls the power switching element 615 to an enabled (i.e., closed) state that permits power to flow from the power input 605 to the power output 610. As an example, when a power switch, such as the power switch 305 (FIG. 3), of the second electronic tool 400 is placed in an on/enabled state in advance of block 720 (e.g., by a user in a setup stage), enabling the power switching element 615 in block 720 activates the second electronic tool 400 because power is supplied to a load of the second electronic tool 400 when the power switching element 615 is enabled. In other examples, the controller 625 communicates an activation command to the second electronic tool 400 to activate the second electronic tool 400. The activation command may be sent by the controller 625 over the power output 610, via a separate data line between the controller 625 and a controller of the second electronic tool 400 (e.g., the motor control unit 220), or via the wireless hardware 630 over a wireless connection with the controller of the second electronic tool 400.

As a first example, the first electronic tool 115 is a power tool (e.g., a saw or sander) that generates dust during operation, and the second electronic tool 400 may be a dust collecting vacuum, such as the vacuum 115b (FIG. 3). In this example, the method 700 results in automatic activation of the dust-collecting vacuum in response to activation of the dust-generating power tool. As a second example, the first electronic tool 115 is also power tool (e.g., a rotary hammer or concrete saw) that generates dust during operation, and the second electronic tool 400 may be an electronically controllable water valve or pump providing a dust suppressing water flow. In this example, the method 700 results in automatic activation of the valve or pump providing a dust suppressing water flow (e.g., aimed at or near the output unit of the first electronic tool 115) in response to activation of the dust-generating power tool.

In some embodiments, controlling the second electronic tool 400 in block 720 includes other control actions. Other control actions may include transmitting a parameter update to the second electronic tool 400 that adjusts an operational parameter of the second electronic tool 400. The parameter may be transmitted by the controller 625 over the power output 610, via a separate data line between the controller 625 and a controller of the second electronic tool 400 (e.g., the motor control unit 220), or via the wireless hardware 630 over a wireless connection with the controller of the second electronic tool 400. Example operation parameters that are controlled in block 720 include motor speed, light level, volume level, wireless communication. In a third example, the parameter update may cause a change in a volume parameter of a radio embodiment of the second electronic tool 400. In this example, the volume parameter may be increased in block 720 such that the method 700 results in an increased volume of the radio (the second electronic tool 400) in response to activating the first electronic tool 115. The increased volume enables a user to more easily hear the audio of the radio despite operation of the first electronic tool 115. In other examples, motor speed of the second electronic tool 400 is increased or decreased; light level of the second electronic tool 400 is increased or decreased; and wireless communications by the second electronic tool 400 are requested (for example, causing the transmission of operational data from the second electronic tool 400 to the first electronic tool system 105, to the personal mobile device 128, or to another electronic device).

In some embodiments, the memory 635 of the second adapter 405 stores instructions for executing various control actions to be executed in block 720, where the instructions for particular control actions are associated with particulars activation signals. Thus, different activation signals received (e.g., from different source devices) may result in different control actions by the second adapter 405.

Figure 8:
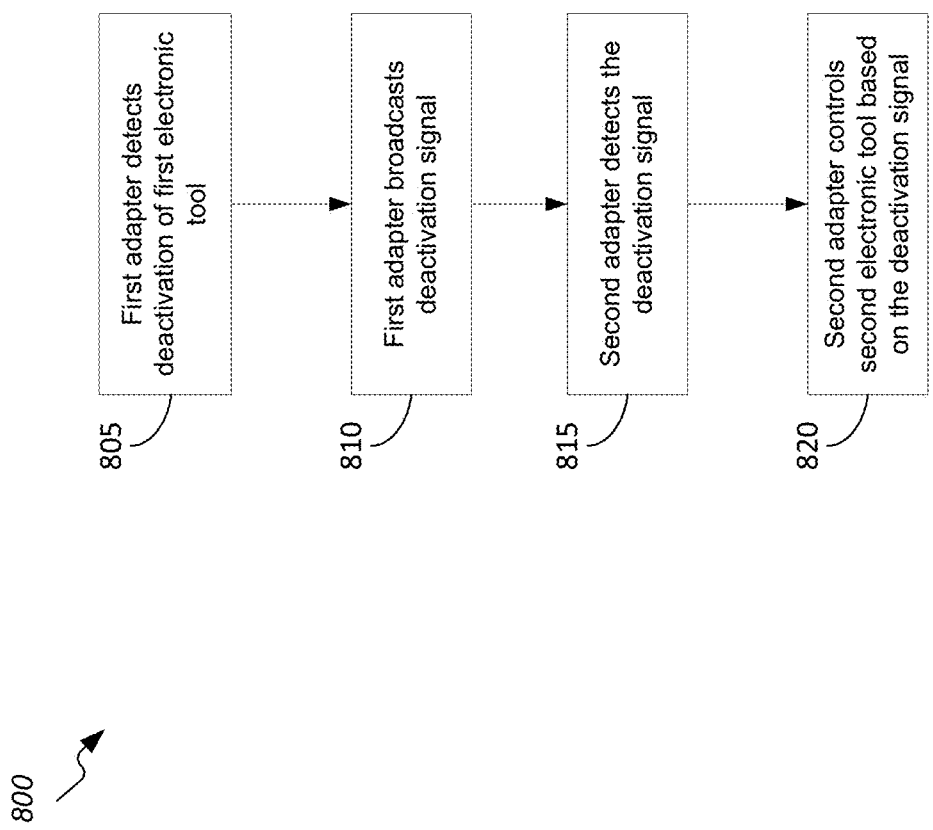
FIG. 8 illustrates another method of tool-to-tool communication.

FIG. 8 illustrates a method 800 of tool-to-tool communication. In some embodiments, the method 800 is implemented with one of the embodiments of the system 100 of FIG. 1 and, accordingly, the method 800 will be described with respect to the system 100. However, in some embodiments, the method 800 is implemented with other systems. In some embodiments, the method 700 and the method 800 are performed sequentially such that the method 800 begins after block 720 of the method 700. In other embodiments, the method 800 is performed independently of the method 700.

In block 805, the controller 525 of the first adapter 120 detects deactivation of the first electronic tool 115. For example, in some embodiments, the operational sensor 520 of the first adapter 120 is a current sensor that detects a ceasing of current drawn from the first power source 125 by the first electronic tool 115 when the first electronic tool 115 is deactivated. For example, in response to deactivation of the first electronic tool 115 (e.g., via a trigger such as the trigger 175 of FIG. 2 or a power switch such as the power switch 305 of FIG. 3), the first electronic tool 115 ceases drawing current through the first adapter 120 (via the power input 505 and the power output 510), which is sensed by the operational sensor 520 and thereby detected by the controller 525 of the first adapter 120.

In block 810, the controller 525 of the first adapter 120 broadcasts a deactivation signal. For example, the controller 525 broadcasts the deactivation signal wirelessly via the wireless hardware 530. The deactivation signal may include one or more of an indication that tool deactivation occurred and a source identifier (e.g., an identity of the first adapter 120, an identity of the first electronic tool 115, or both). In some embodiments, the deactivation signal is broadcast by the first adapter 120 generally without a particular destination identifier. In some embodiments, the deactivation signal is broadcast by the first adapter 120 with a destination identifier, such as an identity of the second electronic tool system 110, which may be an identity of the second adapter 405 or the second electronic tool 410. In some embodiments, the deactivation signal broadcast by the first adapter 120 is transmitted via an existing communication link between the first adapter 120 and the second adapter 405 (e.g., a Bluetooth or Wi-Fi connection previously established).

In block 815, the controller 625 of the second adapter 405 receives the deactivation signal broadcast by the first adapter 120. For example, the deactivation signal may be received by the wireless hardware 630 of the second adapter 405 (over the wireless link 130) and forwarded to the controller 625 of the second adapter 405. The controller 625, in turn, determines that the deactivation signal is from the first electronic tool system 105, for example, based on a match of the source identifier of the deactivation signal with an identifier stored in the memory 635. In the event that a deactivation signal is received in block 815 that is from another device having a source identifier that does not match with an identifier stored in the memory 635, the controller 625 may exit the method 800 (i.e., bypass block 820) or loop back to block 815 to await detection of another deactivation signal. Accordingly, the second adapter 405 may dismiss deactivation signals received from unassociated devices.

In block 820, the controller 625 of the second adapter 405 controls the second electronic tool 400 based on the deactivation signal received. In some embodiments, controlling the second electronic tool 400 in block 820 includes the second adapter 405 deactivating the second electronic tool 400. For example, the controller 625 controls the power switching element 615 to a disabled (i.e., open) state that prevents power from flowing from the power input 605 to the power output 610. In other examples, the controller 625 communicates a deactivation command to the second electronic tool 400 to deactivate the second electronic tool 400. The deactivation command may be sent by the controller 625 over the power output 610, via a separate data line between the controller 625 and a controller of the second electronic tool 400 (e.g., the motor control unit 220), or via the wireless hardware 630 over a wireless connection with the controller of the second electronic tool 400.

Returning to the first example, the method 800 results in automatic deactivation of the dust-collecting vacuum in response to deactivation of the dust-generating power tool (e.g., a saw or sander). Additionally, when the method 700 and 800 are executed sequentially, the methods result in the automatic activation and deactivation of the dust-collecting vacuum in response to the activation and deactivation, respectively, of the dust-generating power tool. Returning to the second example, the method 800 results in automatic deactivation of the valve or pump providing a dust suppressing water flow (e.g., aimed at or near the output unit of the first electronic tool 115) in response to deactivation of the dust-generating power tool. Additionally, when the method 700 and 800 are executed sequentially, the methods result in the automatic activation and deactivation of the valve or pump providing a dust suppressing waterflow in response to the activation and deactivation, respectively, of the dust-generating power tool.

In some embodiments, controlling the second electronic tool 400 in block 820 includes other control actions. Other control actions may include transmitting a parameter update to the second electronic tool 400 that adjusts an operational parameter of the second electronic tool 400. The parameter may be transmitted by the controller 625 over the power output 610, via a separate data line between the controller 625 and a controller of the second electronic tool 400 (e.g., the motor control unit 220), or via the wireless hardware 630 over a wireless connection with the controller of the second electronic tool 400. Example operation parameters that are controlled in block 720 include motor speed, light level, volume level, wireless communication. For example, the parameter update may cause a change in a volume parameter of a radio embodiment of the second electronic tool 400. Returning to the third example, the volume parameter may be decreased in block 820 such that the method 800 results in a decreased volume of the radio (the second electronic tool 400) in response to deactivating the first electronic tool 115. Additionally, when the method 700 and 800 are executed sequentially, the methods result in the automatic increase and decrease of the radio volume in response to the activation and deactivation, respectively, of the second electronic tool 400.

In some embodiments, the memory 635 of the second adapter 405 stores instructions for executing various control actions to be executed in block 820, where the instructions for particular control actions are associated with particulars deactivation signals. Thus, different deactivation signals received (e.g., from different source devices) may result in different control actions by the second adapter 405.

In some embodiments, other operational parameters controlled in blocks 720 and 820 include an intensity of a light (e.g., of a work flood light) or a flow rate of water (e.g., for the valve or pump examples).

In some embodiments, in addition or instead of the operational state being detected and transmitted in blocks 705 and 710, respectively, of the method 700, one or more other operational parameters are detected and transmitted in method 700. Examples of such other operational parameters that are detected in block 705 include one or more of motor speed, current draw, battery level, runtime, light level, user input on tool, wireless communication of tool, and the like. In turn, an indication for each of these one or more other detected operational parameters is broadcast in block 710 as at least a part of the activation signal. In some embodiments, the indication is a particular measured or calculated amount for the detected operational parameter in block 705 (e.g., amps drawn or lumens emitted), and, in other embodiments the indication categorizes the detected operational parameter. Example categorizations include the operational parameter being above a certain threshold, below a certain threshold, within a certain range, and the like. In such embodiments of the method 700 using one or more other operational parameters in addition or instead of the operational state, in block 715, the indication of the one or more operational parameters is detected by the controller 625 as part of the activation signal; and, in block 720, the control action is further based on the one or more other operational parameters.

To illustrate some embodiments of the method 700 using one or more other operational parameters in addition or instead of the operational state, modified versions of earlier examples are described below. Returning to the first example, in some embodiments, the activation signal (broadcast block 710) is configured to indicate an intensity of operation of the first electronic tool 115 that is detected in block 705. When the first electronic tool 115 is indicated to be operating at high intensity (e.g., based on current draw being above a threshold or a selected mode), the dust collecting vacuum is controlled (block 720) to operate with a higher suction force than when the activation signal indicates that the first electronic tool 115 is operating at a lower intensity. Returning to the second example, in some embodiments, when the activation signal indicates that the first electronic tool 115 is operating at high intensity (e.g., based on current draw being above a threshold or a selected mode), the valve or pump is controlled to provide a greater water flow than when the activation signal indicates that the first electronic tool 115 is operating at a lower intensity. Returning to the third example, when the activation signal indicates that the first electronic tool 115 is operating at high intensity (e.g., based on current draw being above a threshold or a selected mode), the volume is controlled to increase more than when the activation signal indicates that the first electronic tool 115 is operating at a lower intensity. In these embodiments, the method 700 may loop back to block 705 after block 720 (for example, until deactivation of the first electronic tool 115) such that the controller 625 continuously updates controls of the second electronic tool 400 based on changing operational parameters of the first electronic tool 115 sensed by the first adapter 120.

Accordingly, in some embodiments of the method 700, block 705 may be described as the first adapter detecting an operational parameter of the first electronic tool; block 710 may be referred to as the first adapter broadcasting an activation signal indicating the operational parameter; block 715 may be referred to as the second adapter detecting the activation signal indicating the operational parameter; and block 720 may be referred to as the second adapter controlling the second electronic tool based on the activation signal (or, more particularly, based on the operational parameter).

As noted with respect to block 715 and 815, potential source identifiers may be stored in the memory 635 of the second adapter 405 for authorizing received activation and deactivation signals based on their included source identifiers. In some embodiments, the first adapter 120 and the second adapter 405 are paired at the time of manufacture such that the identity of the first adapter 120 is stored in the memory 635 of the second adapter for this authorization.

In some embodiments, the first adapter 120 and the second adapter 405 are paired after the point of manufacture by a user in the field. For example, the first adapter 120 broadcasts a pairing identification signal (e.g., in response to receiving user actuation of a pairing button that is part of the user input 540). The second adapter 405 detects the pairing identification signal. The second adapter pairs to the first adapter (e.g., by storing an identity of the second adapter 405 in the memory 635 for matching purposes in block 715 and 815). The second adapter 405 may also send an acknowledgement signal.

In another example, the personal mobile device 128 pairs the first adapter 120 and the second adapter 405. The personal mobile device 128 and the first adapter 120 form a wireless communication link. The first adapter 120 broadcasts a pairing identification signal over the wireless communication link, which is detected by the personal mobile device 128. The pairing identification signal may be sent in response to a request from the personal mobile device 128. The personal mobile device 128 and the second adapter 405 then form a wireless communication link. The personal mobile device 128 then sends pairing instructions to the second adapter 405 over the wireless communication link. In response, the second adapter 405 pairs to the first adapter (e.g., by storing an identity of the first adapter 120 in the memory 635 for matching purposes in block 715 and 815).

The personal mobile device 128, in some embodiments, is further configured to set and adjust the control actions to be executed in blocks 720 and 820 by the second adapter 405. For example, in addition to the pairing instructions sent by the personal mobile device 128 to the second adapter 405, the personal mobile device 128 sends configuration data that adjusts the control actions stored in the memory 635. The personal mobile device 128 may provide a graphical user interface enabling receipt of user input that selects the particular configuration data (and, thereby, the control actions).

Additionally, the personal mobile device 128 may unpair the first adapter 120 and the second adapter 405, and pair the first adapter 120 with a different adapter (another instance of the second adapter 405 associated with another instance of the second electronic tool 400).

Additionally, in some embodiments, the broadcast activation and deactivation signals of the methods 700 and 800 may be detected by multiple second adapters 405, each associated with a respective second electronic tool 400, in block 715 and 815. In response, in blocks 720 and 820, each respective second adapter 405 controls the associated second electronic tool 400.

In some embodiments, the first and second adapters switch roles in the methods 700 and 800 (and the various alternative embodiments discussed in relation to the methods 700 and 800). For example, the second adapter 405 performs the detection of the second electronic tool 400 and broadcasting in blocks 705, 710, 805, and 810, and the first adapter 102 performs the detecting and controlling of the first electronic tool 115 in blocks 715, 720, 815, and 820. Additionally, in such embodiments, the source identifier(s) and control action(s) are stored in the memory 535 of the first adapter 120.

As noted above, the first adapter 120 is removably coupled to the first electronic tool (see, e.g., FIGS. 1, 2A, and 3) and, in some embodiments, the second adapter 405 is removably coupled to the second electronic tool 400 (see, e.g., FIG. 4A). The removable nature of these adapters enables connection to various types of electronic tools. Thus, a user is able to pair electronic tools by coupling paired adapters to these electronic tools, respectively (or coupling and then pairing the adapters, as described above). This pairing ability, which can occur after purchase and multiple times throughout the life of the adapters in the field, provides flexibility to a user.

What is claimed is:

1. A system for tool communication, the system comprising:
    a first electronic tool that includes:
        an activation input,
        a first motor,
        a first wireless communication hardware,
        a first electronic controller including a first electronic processor that is communicatively coupled to a first memory, the activation input, the first motor, and the first wireless communication hardware, wherein the first memory of the first electronic tool includes instructions that, when executed by the first electronic processor, cause the first electronic controller to:
            transmit an activation signal based on an operation of the activation input via the first wireless communication hardware; and
    a second electronic tool that includes:
        a second wireless communication hardware,
        a second electronic controller including a second electronic processor that is communicatively coupled to a second memory and the second wireless communication hardware, wherein the second memory of the second electronic tool includes instructions that, when executed by the second electronic processor, cause the second electronic controller to:
            activate, in response to receiving the activation signal via the second wireless communication hardware of the second electronic tool, the second electronic tool,
    wherein the second electronic tool is an electronically controllable water flow device configured to provide a dust suppressing water flow,
    wherein the activation signal indicates a first operation intensity of the first electronic tool, and
    wherein the activation signal causes the water flow device to operate at a second operation intensity based on the first operation intensity.

2. The system of claim 1, wherein the first electronic tool is a saw.

3. The system of claim 1, wherein the first electronic controller is further configured to transmit, via the first wireless communication hardware, a deactivation signal based on a deactivation of the activation input.

4. The system of claim 1, wherein the first electronic controller is further configured to:
    determine an operational parameter of the first electronic tool; and
    send, in response to the operational parameter of the first electronic tool, a control signal to the second electronic controller via the second wireless communication hardware, and
    wherein the second electronic controller is further configured to control the second electronic tool in response the control signal.

5. The system of claim 4, wherein the second electronic tool further includes a light and, in response to receiving the control signal via the second wireless communication hardware of the second electronic tool, the second electronic tool turns-on or adjusts an intensity of the light.

6. The system of claim 4, wherein the first electronic tool is configured to determine a second operational parameter of the first electronic tool and transmit, via the first wireless communication hardware, a second control signal based on the second operational parameter; and
    the second electronic tool is configured to:
        adjust, in response to receiving the second control signal from the first electronic tool, operation of the second electronic tool based on the second operational parameter.

7. The system of claim 6, wherein the second wireless communication hardware of the second electronic tool is part of an adapter attached to the second electronic tool, and the adapter is configured to transmit the control signal to the second electronic controller of the second electronic tool.

8. A method for controlling a second electronic tool operation by a first electronic tool, the method comprising:
    determining, by a first electronic controller of the first electronic tool, an activation of the first electronic tool via an activation of an activation input of the first electronic tool;
    transmitting, by the first electronic controller, an activation signal based on the activation of the first electronic tool via a first wireless communication hardware of the first electronic tool;
    activating, by a second electronic controller of an electronically controllable water flow device and in response to receiving the activation signal based on the activation of the activation input of the first electronic tool via a second wireless communication hardware of the electronically controllable water flow device, the electronically controllable water flow device according to the activation of the first electronic tool;

determining, by a first electronic controller of a first electronic tool, a deactivation of the first electronic tool via a deactivation of the activation input of the first electronic tool;

transmitting, by the first electronic controller, a deactivation signal based on the deactivation of the first electronic tool via a first wireless communication hardware of the first electronic tool; and controlling, by the second electronic controller of the electronically controllable water flow device and in response to receiving the deactivation signal based on the deactivation of the activation input of the first electronic tool via a second wireless communication hardware of the electronically controllable water flow device, the electronically controllable water flow device according to the deactivation of the first electronic tool, wherein the activation signal indicates a first operation intensity of the first electronic tool, and wherein the activation signal causes the water flow device to operate at a second operation intensity based on the first operation intensity.

9. The method of claim 8, wherein the first electronic tool is a power saw, and wherein controlling the electronically controllable water flow device, by the second electronic controller, includes controlling the electronically controllable water flow device to provide a dust suppressing water flow.

10. The method of claim 8, wherein the electronically controllable water flow device further includes a light, and wherein controlling the electronically controllable water flow device by the second electronic controller, includes turning on or adjusting an intensity of the light.

11. The method of claim 8, wherein the first electronic tool is configured to determine an operational parameter of the first electronic tool and transmit a control signal based on the operational parameter via the first wireless communication hardware; and the electronically controllable water flow device is configured to adjust, in response to receiving the control signal from the first electronic tool, operation of the electronically controllable water flow device based on the operational parameter.

12. The method of claim 11, wherein the first electronic tool is configured to determine a second operational parameter of the first electronic tool and transmit a second control signal based on the second operational parameter via the first wireless communication hardware; and the electronically controllable water flow device is configured to adjust, in response to receiving the second control signal from the first electronic tool, operation of the electronically controllable water flow device based on the second operational parameter.

13. The method of claim 11, wherein the second wireless communication hardware of the electronically controllable water flow device is part of an adapter attached to the electronically controllable water flow device, and the adapter is configured to transmit the control signal based on the operational parameter of the first electronic tool to the second electronic controller of electronically controllable water flow device.

14. The method of claim 11, wherein the electronically controllable water flow device includes a controllable element that is at least one selected from the group of an electronically controllable valve and a pump motor, and wherein, to adjust operation of the electronically controllable water flow device in response to receiving the control signal, the second electronic controller is configured to control the controllable element.

15. A system for a power saw in control of an electronically controllable water flow device, the system comprising:
a power saw that includes:
a power saw activation input,
a first motor,
a first wireless communication hardware, and
a first electronic controller including a first electronic processor that is communicatively coupled to a first memory, the power saw activation input, the first motor, and the first wireless communication hardware, wherein the first memory of the power saw includes instructions that, when executed by the first electronic processor, cause the first electronic controller to:
transmit an activation signal via the first wireless communication hardware;
and
an electronically controllable water flow device that includes:
a second wireless communication hardware,
a second electronic controller including a second electronic processor that is communicatively coupled to a second memory and the second wireless communication hardware, wherein the second memory of the electronically controllable water flow device includes instructions that, when executed by the second electronic processor, cause the second electronic controller to:
activate, in response to receiving the activation signal from the power saw via the second wireless communication hardware of the electronically controllable water flow device, the electronically controllable water flow device to turn on,
wherein the activation signal indicates a first operation intensity of the power saw, and
wherein the activation signal causes the water flow device to operate at a second operation intensity based on the first operation intensity.

16. The system of claim 15, wherein the power saw is a concrete saw.

17. The system of claim 15, wherein the first electronic controller is further configured to transmit, via the first wireless communication hardware, a deactivation signal based on a deactivation of the power saw activation input.

18. The system of claim 15, wherein the first electronic controller is further configured to:
determine an operational parameter of the power saw; and
send, in response to the operational parameter of the power saw, a control signal to the second electronic controller via the first wireless communication hardware, and
wherein the second electronic controller is further configured to control the electronically controllable water flow device in response the control signal.

19. The system of claim 18, wherein the power saw is configured to determine a second operational parameter of the power saw and transmit, via the first wireless communication hardware, a second control signal based on the second operational parameter; and
the electronically controllable water flow device is configured to adjust, in response to receiving the second control signal from the power saw, operation of the electronically controllable water flow device based on the second operational parameter.

20. The system of claim 19, wherein the second wireless communication hardware of the electronically controllable water flow device is part of an adapter attached to the electronically controllable water flow device, and the adapter is configured to transmit the control signal to the second electronic controller.

\* \* \* \* \*